United States Patent
Fascenda et al.

(10) Patent No.: US 8,555,068 B2
(45) Date of Patent: Oct. 8, 2013

(54) SECURE MOBILE TELEPHONY

(75) Inventors: Anthony C. Fascenda, North Bethesda, MD (US); Emil Sturniolo, Medina, OH (US); Paul Benware, Mendon, NY (US); Robert Cichielo, Asbury, NJ (US)

(73) Assignee: Koolspan, Inc., Bethesda, MD (US)

( * ) Notice: Subject to any disclaimer, the term of this patent is extended or adjusted under 35 U.S.C. 154(b) by 1581 days.

(21) Appl. No.: 11/951,202

(22) Filed: Dec. 5, 2007

(65) Prior Publication Data
US 2009/0122984 A1  May 14, 2009

Related U.S. Application Data

(60) Provisional application No. 60/987,709, filed on Nov. 13, 2007.

(51) Int. Cl.
*H04L 9/12* (2006.01)

(52) U.S. Cl.
USPC .......................................... 713/171; 380/247

(58) Field of Classification Search
None
See application file for complete search history.

(56) References Cited

U.S. PATENT DOCUMENTS

| | | | |
|---|---|---|---|
| 5,689,563 A | 11/1997 | Brown et al. | |
| 7,835,723 B2 * | 11/2010 | Bjugan et al. | 455/410 |
| 2004/0059921 A1 * | 3/2004 | Bianchi | 713/185 |
| 2005/0048971 A1 | 3/2005 | Findikli et al. | |
| 2006/0085844 A1 * | 4/2006 | Buer et al. | 726/4 |
| 2006/0154695 A1 | 7/2006 | Ishibashi | |
| 2008/0141331 A1 * | 6/2008 | Tasker et al. | 726/1 |

OTHER PUBLICATIONS

International Search Report Dated Apr. 3, 2008 for International Application No. PCT/US07/26441.

* cited by examiner

*Primary Examiner* — Gilberto Barron, Jr.
*Assistant Examiner* — Simon Kanaan
(74) *Attorney, Agent, or Firm* — Hunton & Williams LLP (57) ABSTRACT

An system for and method of providing end-to-end encrypted real-time phone calls using a commodity mobile phone and without requiring service provider cooperation is presented. The system and method improve upon prior art techniques by omitting any requirement for mobile phones that are specially manufactured to include end-to-end encryption functionality.

90 Claims, 3 Drawing Sheets

SECURE MOBILE TELEPHONY

RELATED APPLICATION

The present application claims priority to U.S. Provisional Application No. 60/987,709 entitled "Secure Mobile Telephony" to Fascenda et al., filed Nov. 13, 2007, the contents of which is incorporated by reference herein in its entirety.

FIELD OF THE INVENTION

The present invention generally relates to a system for and method of secure telephony. More particularly, the present invention generally relates to a system for and method of receiving and making encrypted phone calls to and from, respectively, a mobile phone.

BACKGROUND OF THE INVENTION

Although some cellular phone service providers will encrypt communications between a cellular phone and the base station (e.g., cell phone tower) with which the cellular phone is currently communicating, such providers generally decrypt such communications at the base station. Thus, such communications exist in unencrypted form at some point. Accordingly, such cellular phone service providers fail to provide for real-time voice communications between a mobile phone and another telephonic device that are encrypted throughout their entire passage between phones, i.e., such service providers fail to provide real-time end-to-end encryption of voice communications. (As used herein, the terms "end-to-end" and "end to end," when used in conjunction with the terms "encrypt," "encrypted" and so forth, mean that the communications are not in an unencrypted state at any point during their entire path between telephonic devices, except at the telephonic devices themselves.)

In general, prior art techniques for allowing mobile phones to provide end-to-end encryption of real-time voice communications require specially designed and manufactured cellular phones, cooperation from an associated service provider, or significant effort exerted by the conversing parties to coordinate the encrypted conversation (e.g., manually dialing multiple numbers or manually conveying cryptographic keys among the communicating parties). Thus, there is a need for an efficient technique that allows standard mobile phones to send and receive real-time voice calls that are encrypted from end to end without requiring special cooperation from communication service providers.

DETAILED DESCRIPTION OF CERTAIN EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Certain embodiments of the present invention allow a commodity mobile telephone (e.g., a standard cellular telephone) to place and receive end-to-end encrypted voice calls without requiring special cooperation from any telephony service provider. Such end-to-end encrypted communications may be in real time (e.g., a conversation between individuals or a call to a PBX or an enterprise exchange), or may be sent to storage, such as an answering service or an archive. Throughout this disclosure, the term "commodity mobile phone" means any mobile phone that is not initially equipped, when manufactured or sold, with the ability to send and receive real-time end-to-end encrypted voice communications over a telephony network. Certain embodiments include an integrated circuit, such as a microSD chip, that plugs into commodity mobile phones and, together with associated software, allows such telephonic devices to send and receive real-time or stored end-to-end encrypted voice communications. That is, certain embodiments allow a user to provision a standard commodity mobile phone with an integrated circuit and associated software to allow for real-time or stored end-to-end encrypted conversations. Throughout this disclosure, the term "integrated circuit" means a singe package or token containing electronic circuitry, whether or not such circuitry exists on a single semiconductor slab or on multiple semiconductor slabs within the package or token. Thus, an integrated circuit may contain one or more semiconductor chips. Certain embodiments allow users to utilize the native, built-in dialing techniques that the commodity mobile phone was originally supplied with (e.g., manual or via a list internal to the phone) to place end-to-end encrypted real-time phone calls.

Figure 1:
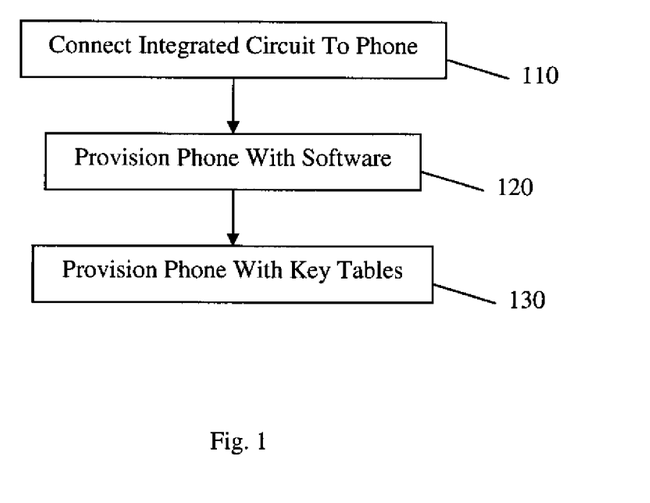
FIG. 1 depicts a technique for provisioning a mobile phone according to an embodiment of the present invention.

FIG. 1 depicts a technique for provisioning a mobile phone according to an embodiment of the present invention. In general, any commodity mobile phone that can accept an integrated circuit may be provisioned and used. Suitable commodity mobile phones include Global System for Mobile communications ("GSM") phones, Personal Communications Service ("PCS") phones, and other types of mobile phones. Such phones may be installed with Windows Mobile, Symbian OS, or other operating systems. Once a user acquires such a commodity mobile phone, the user proceeds to provision the phone to allow for encrypted communications as discussed herein in reference to FIG. 1.

At block 110, the user connects an integrated circuit to the user's commodity mobile phone. The integrated circuit package may be in the form of a microSD card, an SD card, a mini SD card, a Memory Stick, a Memory Stick Duo, a Memory Stick Micro, or others. The user may acquire the integrated circuit from a traditional retail seller, via an online order, or by other techniques. Integrated circuits in accordance with certain embodiments are not simple memory devices, but may contain additional features such as any, or a combination, of a field Programmable Gate Array ("FPGA"), non-volatile memory ("NVM"), volatile memory (e.g., SRAM, DRAM), a general-purpose processor, a dedicated cryptographic processor, a random number generated (either pseudo-random or truly random), and an electronically-readable serial number. As discussed in detail below in reference to FIG. 2, the NVM of each integrated circuit may include one or more key tables.

The integrated circuit may be tamper resistant. By way of non-limiting example, the integrated circuit may include metal layers (e.g., seven metal sheets, at least one of which being constructed of lead) embedded in its package such that the circuitry contained therein is shielded from electromagnetic radiation attacks (e.g., shielded from X-rays). As another non-limiting example, the integrated circuit may be configured to have internal conductive polymer, bonding or organic wires and leads such that any attempts to dissolve the integrated circuit's packaging using a solvent will destroy internal electrical connections, rendering the integrated circuit inoperable. Other embodiments may utilize a packaging material that is impervious to standard industrial solvents. The integrated circuit may guard against electrical power attacks, in which an adversary monitors the amount of electrical current used by the integrated circuit and from such monitoring determine parameters of the integrated circuit. The integrated circuit may include a voltage regulator or be configured to randomly cause current draws in order to foil such attacks.

The integrated circuit may include tamper evident features, in addition, or in the alternative to tamper resistant features. For example, the integrated circuit may be configured to render itself nonfunctional upon detecting electrical probing activity. As yet another example, the integrated circuit may include within its packaging one or more semiconductor wafers that have been milled to reduce their thickness to, by way of non-limiting examples, less than: ten micrometers ("µm"), 20 µm, 50 µm, 100 µm, 200 µm or 500 µm. Such thin wafers are more fragile than conventional wafers and are therefore more likely to be damaged upon being tampered with.

At block 120, the provisioning process continues by supplying the commodity mobile phone with software. The software may be installed on top of the mobile phone's operating system, i.e., without significantly modifying the operating system itself. The software may be installed in one or both of the commodity mobile phone and the integrated circuit with which the commodity mobile phone is provisioned. There are many ways to supply the mobile phone with software. The software may be a pre-loaded application resident on the integrated circuit. In such instances, installing the integrated circuit at block 110 may automatically trigger installation of the software on the mobile phone, either immediately, under user control, or upon the next cold start of the commodity mobile phone. The software may be communicated to the mobile phone by sending to the mobile phone a Short Messaging System ("SMS") message containing a URL of an application installer. A user receiving such a message may activate the URL using the existing software on the mobile phone in order to direct the mobile phone to install the software. A user may receive such a URL in an email message instead of, or in addition to, receiving the URL in an SMS. The user may type such a URL manually into the commodity mobile phone's existing internet (e.g., a browser). Other ways to convey software to the mobile phone include operating-system-specific techniques, such as by using ActiveSync, an installation utility available in phones equipped with a Windows Mobile operating system.

Once the software is installed and activated, it checks the integrated circuit's NVM for a stored commodity mobile phone identification. Such an identification may be, by way of non-limiting example, an International Mobile Equipment Identity ("IMEI"), an Electronic Serial Number ("ESN") or a Mobile Identification Number ("MIN"). If such an identification is absent, the software retrieves an identification of the commodity mobile phone and stores it in the integrated circuit's NVM. If, on the other hand, an identification is already present in the NVM, the software retrieves an identification of the commodity mobile phone and compares it against the identification already stored in NVM. If the two are identical, then the operation proceeds as normal (e.g., to block 130 if the phone is not yet provisioned, or to a ready-to-call state if the phone is already fully provisioned). If the two differ, then the software may prevent the commodity mobile phone from utilizing one or more functions available from the integrated circuit (e.g., memory storage and retrieval, encryption, decryption, etc.). The software may accomplish this in a variety of ways, such as, by way of non-limiting example, reprogramming the integrated circuit to destroy some or all functionality contained therein, configuring the software itself to refuse to operate, or reprogramming the commodity mobile phone so as to disable it (effectively setting the commodity mobile phone to so-called "brick mode"). The checking process described in the present paragraph may be performed periodically or each time the commodity mobile phone is powered on.

At block 130, the commodity mobile phone is provisioned with key tables. The key tables may be stored in one or both of the commodity mobile phone and the integrated circuit with which the commodity mobile phone is provisioned. The key tables may be delivered to or generated by the mobile phone, or may be present on the integrated circuit when the integrated circuit is acquired. For delivered key tables, managed providers or enterprises may monitor and track the delivery of the key tables. By way of non-limiting examples, delivery may be by way of standard communication techniques such as a SMS push, an email, a download via a web portal, or a combination of techniques. Such a SMS push or email may initially deliver a URL for an application installer. The software installed at block 120 may act to inform a back-end system that the phone has been provisioned with key tables. Accordingly, a back-end system may keep track of all commodity mobile phones that have been provisioned with key tables. The back-end system may track the key table provisioning status for each mobile phone. Status descriptions include "not provisioned," "delivered," "confirmed," "errors encountered," "installation complete," "expired," "blocked," etc.

Figure 2:
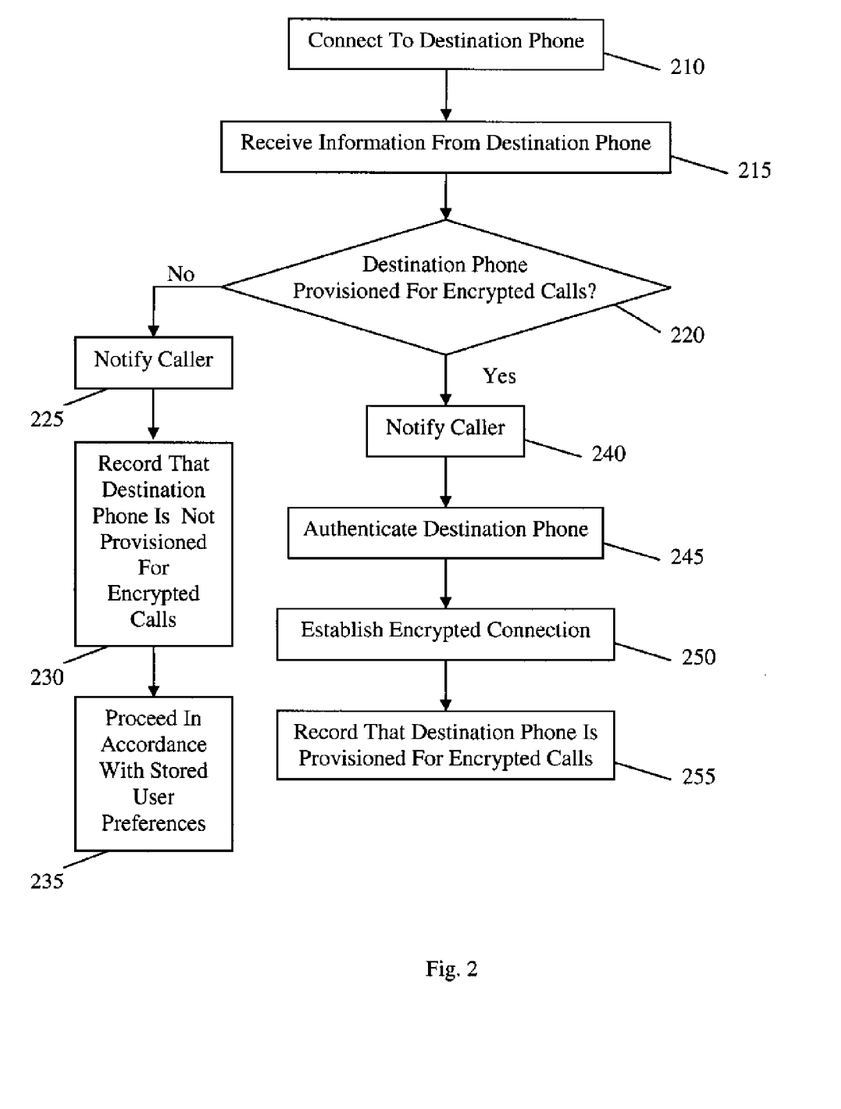
FIG. 2 depicts a technique for establishing an encrypted phone call according to an embodiment of the present invention.

FIG. 2 depicts a technique for establishing an encrypted phone call according to an embodiment of the present invention. Once a commodity mobile phone is provisioned as set forth in the discussion regarding FIG. 1, the phone is ready to engage in encrypted communications. The process begins when a user of a properly provisioned commodity mobile phone connects to a destination phone or other telephonic device at block 210. The connection may be by way of an ordinary mobile phone call placed to the destination phone. Specific techniques for effecting the connection are discussed below in reference to FIG. 3.

At block 215, after the commodity mobile phone connects to the destination phone, the commodity mobile phone waits a period of time (by way of non-limiting example, two seconds) to receive information from a properly provisioned destination phone. The mobile phone determines, based on the results of its monitoring, whether the destination phone is provisioned for encrypted calls at block 220.

In general, if the destination phone is not capable of handling encrypted calls, then it will not send the appropriate information and an encrypted call will not be effected. In that case, control proceeds from decision block 220 to block 225 in which the caller is notified that an encrypted call is not possible. The commodity mobile phone may notify its user per block 225 by any, or a combination, of playing a sound, generating a message, and displaying an icon. The sound may be a simple tone, a complex sound, a word or a phrase. Essentially any sound may be used, and the user may customize the sound. Types of visual notifications are discussed below in reference to FIG. 3. Other types of notifications may be employed for users who are impaired, or in environments where visual or audible alerts would not be appropriate. After alerting the calling user that an encrypted call is not possible, control proceeds to block 230, in which the mobile phone records that the destination phone cannot handle encrypted calls. If the mobile phone previously had recorded that the destination phone was capable of receiving encrypted phone calls, then the mobile phone will update its records to reflect the change in status. At block 235, the mobile phone acts according to stored user preferences. Such preferences may include dropping the call or proceeding with the unencrypted call.

If, on the other hand, the destination phone is provisioned for encrypted calls, then it will send information indicating its status to be received by the mobile phone at block 215. Information sent from a destination phone to a commodity mobile phone in order to indicate that an encrypted call is possible may take many different forms. For example, upon receiving a phone call from an unknown source, a properly provisioned destination phone may alert the calling phone that it can handle encrypted calls by playing one or more DTMF tones. As a specific example, a properly provisioned destination phone may play the DTMF tone corresponding to "#" to confirm its ability to handle encrypted calls. However, the destination phone may code information into its reply in addition to a simple acknowledgement that the destination phone is capable of handling encrypted calls. Examples of such additional information are discussed in detail below in reference to block 250. Other techniques for sending status information between the communicating telephonic devices include, by way of non-limiting example, SMS, email, etc. As yet another example, status information may be conveyed using inaudible tones, such as ultrasonic or infrasonic tones.

Once the mobile phone determines that the destination phone can handle encrypted calls at decision block 220, control passes to bock 240 in which the mobile phone alerts its user that an encrypted call is about to be established. Similar to block 230, the alert may take a number of possible forms, such as by one or both of playing a sound and displaying an icon. Again, essentially any sound, such as a simple tone, a complex sound, a word or a phrase may be used, and a user may customize such sounds. Types of visual notifications are discussed below in reference to FIG. 3.

At block 245, the mobile phone authenticates the destination phone. An exemplary authentication technique is discussed below in reference to the Table.

TABLE

| Commodity Mobile Phone | | Destination Phone |
|---|---|---|
| Available Key Table IDs | → | |
| | ← | Selected Key Table ID, Key Index, Encrypted RN1 |
| Encrypted RN2 | → | |
| Calculate Key | | Calculate Key |

The exemplary authentication technique includes a series of messages exchanged between the commodity mobile phone and the destination phone. The messages may be conveyed over any communications channel available to the commodity mobile phone. By way of non-limiting example, such a data channel my be a Circuit Switched Data ("CSD") channel, a 2g channel, a 3g channel or a WiFi channel. (By way of background, some phones, such as those that comply with the GSM specifications, are equipped with both voice and CSD channels. The CSD channel is essentially a data channel, and may be used for the authentication messages of block 245.) In reference to the Table, a "key table" is an indexed table of cryptographic keys along with an ID associated with the table. The key table may be part of a larger container object. Key tables as taught in U.S. patent application Ser. No. 10/964,755 entitled "Mass Subscriber Management" to Fascenda may be used in certain embodiments of the present invention.

The initial authentication step, as depicted in the Table, includes the commodity mobile phone transmitting to the destination phone a list of IDs for key tables that the commodity mobile phone has access to. Such key tables may be stored on, for example, the NVM of the integrated circuit with which the commodity mobile phone has been provisioned. Upon receiving the list of key table IDs, the destination phone selects from the list an ID of a key table to which the destination phone also has access (e.g., in the destination phone's provisioned integrated circuit's NVM). The destination phone further selects an index for a key selected from that table. The next step in the authentication includes the destination phone replying with the selected key table ID, the selected key index and a first random number encrypted using the key identified by the key table ID and selected key index. (Encryption may be by way of any of a variety of cryptographic algorithms, including, by way of non-limiting example, an AES algorithm such as Rijndael.) Both phones may display information indicating the key table and key index that are in use. The next step in the authentication process includes the commodity mobile phone transmitting a second random number (different from the first random number) encrypted using an identified key. At this stage in the authentication process, both phones know both random numbers, as each is capable of decrypting the random numbers that each has received. Thus, the next step includes each phone independently generating one or more session keys derived from the two decrypted random numbers. This may be accomplished by combining the random numbers using, e.g., concatenation, addition, subtraction, XOR, or other transforms.

The combined random numbers may be used as one or more session keys, may be used as a basis for deriving one or more session keys, or may be subject to additional algorithmic modification (e.g., a hash algorithm) before being used as session key(s). Other techniques are also possible. The one or more session keys may then be used directly to encrypt realtime or stored voice communications between the phones, or may be used as the basis to encrypt such communications. That is, the one or more session keys may be used to create or retrieve one or more other keys, which may then be used to encrypt the communications. By way of non-limiting example, the techniques of U.S. patent application Ser. No. 11/763,843 entitled "System And Method Of Per Packet Keying" to Fascenda may be employed to generate and use per packet keys based on the one or more session keys. The one or more session keys thus enable the establishment of a secure context between the phones. As used herein, the term "secure context" embraces at least one shared cryptographic key, whether such key(s) is/are separately created or generated by two entities or separately conveyed to and received by two entities.

The authentication technique described above may be modified as follows. Prior to the messages described in the Table, the phones may supply each-other with asymmetric key pairs. (As used herein, "asymmetric key pairs" includes key pairs used for asymmetric encryption algorithms such as, by way of non-limiting example, RSA.) Thus, for example, the commodity mobile phone may generate or retrieve an asymmetric key pair and send one key of the pair to the destination phone, and the destination phone may generate or retrieve another asymmetric key pair and send one key of the pair to the commodity mobile phone. The messages described above and in the Table are then encrypted using the asymmetric key pairs.

At block 250, the phones establish an encrypted connection. Note that this step may occur prior to step 245 in some embodiments. There are several ways that an encrypted connection may be established. As one example, the phones may simply begin encrypting, using the common session key(s), the voice signals that they transmit and begin decrypting, using the common session key(s), the signals that they receive. This may be done over the regular voice channel that is already established via the initial phone call. As another example, the phones may utilize a different channel, such as by way of non-limiting example, a CSD channel, a 2g channel, a 3g channel or a WiFi channel associated with the destination phone, for handling the encrypted call. For purposes of explanation, the following discussion will refer to a CSD channel, although other channels may be used instead.

Note that phones that are equipped with both voice and CSD channels may have different phone numbers associated with the different channels. At block 250, the destination phone may request that the calling commodity mobile phone terminate the call and immediately call back on the CSD channel of the destination phone. Once the destination phone detects that the commodity mobile phone terminated the call, the destination phone may start a countdown timer (e.g., 30 seconds). If during this time the commodity mobile phone calls back again on the incoming data channel, the destination phone may automatically answer. A detailed discussion of the process outlined in this paragraph is presented immediately below.

Establishing an encrypted connection, per block 250, using a channel different from the channel of the initial voice call may proceed as explained in the following example. Assume by way of non-limiting example that the destination phone has a voice channel that may be reached using phone number (908) 555-1001 and a CSD channel that may be reached using phone number (908) 555-1503. Note that the CSD channel's number differs from the voice channel's number at the third-to-last and the last digit. The destination phone may instruct the calling commodity mobile phone to establish a new connection by transmitting, at block 215, DTMF tones for "503#" to the commodity mobile phone. The "#" DTMF tone indicates that the destination phone can handle encrypted calls, and the preceeding "503" tones instruct the mobile phone to terminate the present call and call back using the voice channel number modified by replacing its last three digits with "503". The commodity mobile phone, upon receiving the tones, hangs up and dials back using the modified number.

In certain embodiments, the destination phone may instruct the calling commodity mobile phone of the number for the CSD channel by transmitting, per the last example, DTMF tones for "3503#". The first number indicates the number of digits that are to be replaced, and the next three numbers constitute the replacement numbers. Thus, the first digit allows for error detection should the commodity mobile phone fail to receive all of the digits due to any number of factors, such as noise, loss of data, etc.

In certain embodiments, the transmitted tones may further indicate the ID of the key table that was selected during authentication block 245. This information may be encoded, by way of non-limiting example, in the form "nnnn*mmmm#", where the term "nnnn" represents any number of tones that are used to identify the selected key table, and the term "mmmm" represents any number of tones used to identify the CSD channel difference information as discussed above.

An advantage of using DTMF tones is that they are universally recognized by any phone. Thus, certain embodiments of the present invention may be used to establish end-to-end encrypted voice communications between phones supplied by completely different manufacturers. Nevertheless, other techniques for communication a modified phone number to the commodity mobile phone include SMS, email, tones (e.g., ultrasound or infrasound), sounds, etc.

At this point, the commodity mobile phone and the destination phone both have possession of at least one session key as a result of the authentication process (block 245). The phones then use the session key(s), either directly or as a basis for other keys, to encrypt and decrypt voice communications sent and received over the selected communications channel (e.g., CSD, voice, etc.). The actual encryption and decryption operations may be performed by a dedicated cryptographic processor present in the integrated circuit that the commodity mobile phone is provisioned with, by software executing on the phone, or by using other techniques. For GSM phones and in certain embodiments, all data existing between the respective phones' Adaptive Multi-Rate ("AMR") codecs may be encrypted using the session key(s), thereby providing for end-to-end encrypted phone calls.

Once the encrypted connection is established at block 250, control passes to block 255 in which the mobile phone records that the destination phone is equipped to handle encrypted calls. For subsequent calls from the mobile phone to the destination phone, the mobile phone may proceed by immediately dialing the CSD channel's number. This feature is discussed further below in reference to FIG. 3.

Figure 3:
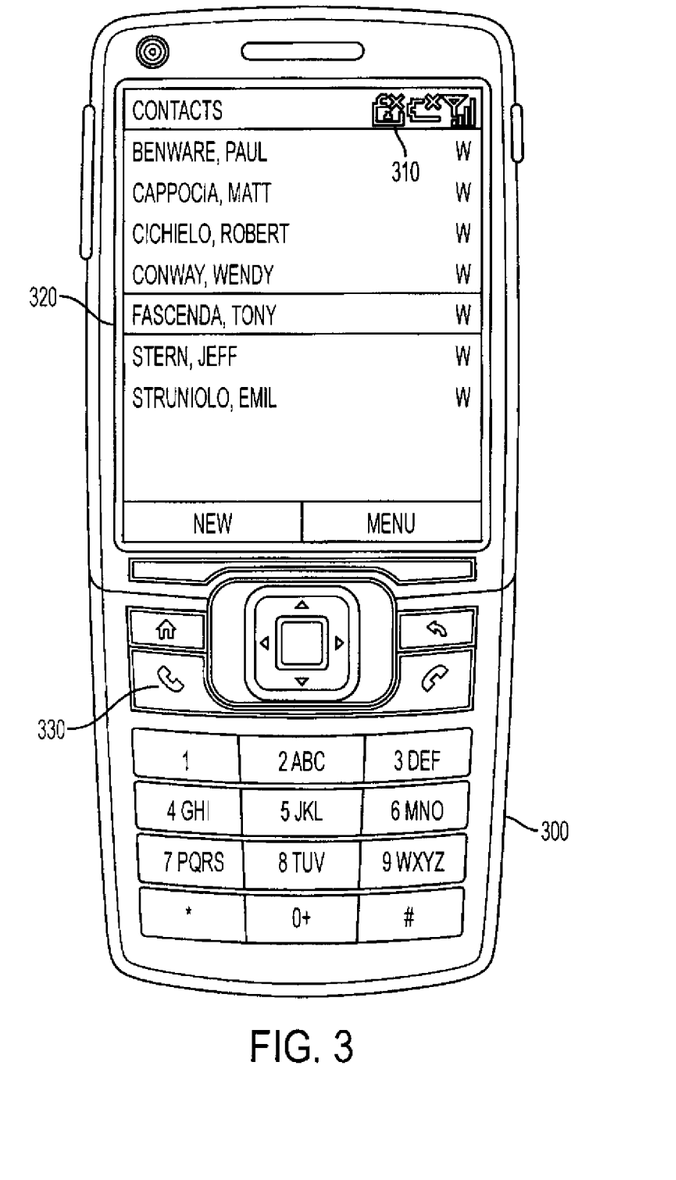
FIG. 3 depicts a mobile phone display according to an embodiment of the present invention.

FIG. 3 depicts a mobile phone display according to an embodiment of the present invention. In particular, FIG. 3 depicts a visual notification 310 that a destination phone is or is not equipped to handle encrypted calls. Thus, an icon 310 may appear at block 240 to indicate that the destination phone is provisioned for encrypted calls. Another icon may appear once the encrypted connection is established, or the initial icon 310 may be modified by, e.g., changing color or removing an "X" icon initially present on icon 310. Tones, sounds, words, phrases, a combination thereof, or other feedback mechanisms may be used in addition or in the alternative. By way of non-limiting example, icons may be displayed or altered for any of the following events: a destination phone answering a call, detecting that a destination phone is provisioned for encrypted calls, re-dialing on a different channel (i.e., attempting to establish a secure connection), establishing an encrypted connection and failing to establish a secure connection. For any of these events, audio signals may be used in addition or in the alternative. In general, the commodity mobile phone's native mechanism for displaying icons and other messages and producing sounds may be used. That is, the commodity mobile phone's built-in operating system may be used to render content, sounds, feedback, etc.

FIG. 3 further illustrates a dialing interface and phone book application present on a commodity mobile phone 300 that has been provisioned for encrypted phone calls. In particular, FIG. 3 depicts a commodity mobile phone's native phone book application, which a user may fill with that user's contacts' information. Note that the dialing interface and phone book depicted in FIG. 3 are essentially identical to the native dialing interface and phone book present in the commodity mobile phone prior to its provisioning according to the blocks discussed in reference to FIG. 1. That is, the overall appearance and outward functionality of the commodity mobile phone's native, built-in dialing interface and phone book are essentially unaffected by configuration to handle encrypted calls. A user may invoke the dialing interface using the standard invocation technique (e.g., by highlighting the record for the destination phone 320 in the commodity mobile phone's phonebook and pressing the talk button 330). By using the dialing interface to place a call to a destination phone that has previously been recorded as being provisioned for encrypted calls as in block 255, the mobile phone may automatically utilize an alternate channel for encrypted calls without first connecting over the standard voice channel. For example, in such a situation, the commodity mobile phone may automatically initially dial the CSD number associated with the destination phone in a prior call.

In some embodiments, the commodity mobile phone's native phonebook is modified to the extent that the data that would normally be stored therein is stored in an alternate location such as, by way of non-limiting examples, the NVM of the integrated circuit with which the commodity phone is provisioned, or alternate storage present in the phone itself.

Embodiments of the present invention may use a variety of cryptographic algorithms. Embodiments may use symmetric algorithms for the encrypted call itself. Asymmetric algorithms may also be used. Suitable symmetric algorithms include, by way of non-limiting example, AES (e.g., Rijndael), DES, Triple DES, IDEA and Blowfish. Suitable asymmetric algorithms include, by way of non-limiting example, RSA and ElGamal.

Certain embodiments of the present invention perform end-to-end encryption in a peer-to-peer manner. By way of background, certain prior art encryption techniques utilize a hub-and-spoke arrangement where a master hub controls all operations and where all communications pass through the hub. In contrast, certain embodiments of the present invention utilize a peer-to-peer arrangement in which encrypted communications pass from one phone to another without necessarily passing through any central hub.

Certain embodiments of the present invention may include the ability to store user preferences related to encrypted calling. Such preferences may be stored in one or both of the NVM of the integrated circuit and memory of the phone itself. Preferences may be adjusted or viewed using a standard graphical user interface ("GUI"). Exemplary preferences include, by way of non-limiting example, the following. The phone may be set to automatically detect whether a destination call is capable of handling encrypted calls. The phone may be set to indicate, using a sound, that an encrypted call has been established. The phone may be set, individually for each entry in the phone's list of contacts (e.g., the contacts depicted in FIG. 3), to always attempt to place an encrypted call. The phone may be set to prevent unencrypted calls from being placed to or received from any individual entry in the phone's list of contacts. Each of these features may be turned on or off by a user of the phone.

Certain embodiments of the present invention may include back-end functionality for administrative and other purposes. The back-end system may be accessed only by authorized managed service providers or registered enterprises. Such a back-end system may include storage for integrated circuit serial numbers, keys and associated information and key tables. Further, such a back-end system may validate and provision key tables for specific integrated circuits. The back-end system may deliver packaged key tables for specific commodity mobile phones to management software (i.e., software operated by a managed service provider or an enterprise customer).

Certain embodiments of the present invention may omit the integrated circuit and instead provide all functionality by way of installed software.

Certain embodiments of the present invention allow for multiple simultaneous encrypted communications. For example, certain embodiments allow a user to establish a conference call with a plurality of telephonic devices. In such embodiments, a commodity mobile phone may establish separate encrypted communications channels with each of the destination telephonic devices. Each such channel may have different cryptographic parameters, such as, by way of non-limiting example, different: key tables, selected keys (as described in above relation to the Table), session keys, and per packet keys. Alternately, one or more channels may share one or more common cryptographic parameters, such a, by way of non-limiting examples, those listed above.

In certain embodiments of the present invention, the functions of authentication, key table generation and provisioning, and provisioning in general may be performed according to the techniques set forth in any, or a combination, of U.S. patent application Ser. No. 10/679,268 entitled "Shared Network Access Using Different Access Keys" to Fascenda, U.S. patent application Ser. No. 10/679,371 entitled "Localized Network Authentication And Security Using Tamper-Resistant Key" to Fascenda, U.S. patent application Ser. No. 10/964,755 entitled "Mass Subscriber Management" to Fascenda, and U.S. patent application Ser. No. 11/763,843 entitled "System And Method Of Per Packet Keying" to Fascenda, the disclosures of which are hereby incorporated by reference in their entireties.

Other embodiments, uses, and advantages of the invention will be apparent to those skilled in the art from consideration of the specification and practice of the invention disclosed herein. The specification and drawings should be considered exemplary only, and the scope of the invention is accordingly not intended to be limited thereby.

We claim:

1. A system for end to end encrypted mobile telephony, the system comprising:
 a tamper resistant and tamper evident integrated circuit adapted to be coupled to a commodity mobile phone, the integrated circuit comprising a cryptographic engine, a programmable processor, a first cryptographic key and a nonvolatile memory, at least a portion of which is at least partially protected by the first cryptographic key; and
 software associated with the integrated circuit configured to be installed in the commodity mobile phone, the software, when installed in the commodity mobile phone, configured to operate in conjunction with the integrated circuit to, when the commodity mobile phone connects to a destination phone using a connection technique of the commodity mobile phone:
  receive a signal from the destination phone indicating that the destination phone is capable of cooperating to provide an encrypted connection;
  authenticate the destination phone; and
  establish an encrypted connection with the destination phone, whereby voice communications between the commodity mobile phone and the destination phone are encrypted end to end.

2. The system of claim 1 wherein the integrated circuit comprises a microSD card.

3. The system of claim 1 wherein the software, when installed in the commodity mobile phone, is further configured to, upon receiving confirmation from the destination phone that the destination phone is capable of cooperating to provide an encrypted connection, operate to disconnect from the destination phone and establish a second connection with the destination phone, wherein the second connection is determined in part by information contained in the signal and wherein the encrypted connection comprises the second connection.

4. The system of claim 1 wherein the connection technique comprises manually dialing a number of the destination phone.

5. The system of claim 1 wherein the connection technique comprises using an automatic dialer.

6. The system of claim 1 wherein the software is supplied to the commodity mobile phone via over the air downloading.

7. The system of claim 1 wherein the software is stored on the integrated circuit prior to installation in the commodity mobile phone.

8. The system of claim 1 wherein the signal comprises DTMF tones.

9. The system of claim 1 wherein the software, when installed in the commodity mobile phone, is further configured to record that the destination phone was capable of cooperating to provide an encrypted connection.

10. The system of claim 9 wherein the software, when installed in the commodity mobile phone, is further configured to operate in conjunction with the integrated circuit to, when the commodity mobile phone subsequently connects to the destination phone, establish an encrypted connection with the destination phone without first receiving a signal indicating that an encrypted connection is available.

11. The system of claim 1 wherein programming the programmable processor requires a cryptographic key.

12. The system of claim 1 wherein the software, when installed in the commodity mobile phone, is further configured to retrieve, from the commodity mobile phone, an identification of the commodity mobile phone upon being first coupled to the commodity mobile phone and to store the identification in the nonvolatile memory, the integrated circuit being configured to reduce available operations if coupled to an electronic device other than a commodity mobile phone corresponding to an identification stored in the nonvolatile memory.

13. The system of claim 1 wherein the destination phone and the commodity mobile phone are manufactured by different entities.

14. The system of claim 1 wherein the software, when installed in the commodity mobile phone, is configured to operate in conjunction with the integrated circuit to establish a secure context for the commodity mobile phone and the destination phone as part of authenticating the destination phone.

15. The system of claim 1 wherein the commodity mobile phone provides an indication to a user that an encrypted connection is available.

16. The system of claim 1 wherein the destination phone is not a mobile phone.

17. A system for end to end encrypted mobile telephony, the system comprising:
  a tamper resistant and tamper evident integrated circuit adapted to be coupled to a commodity mobile phone, the integrated circuit comprising a cryptographic engine, a programmable processor, a first cryptographic key and a nonvolatile memory protected by the first cryptographic key; and
  software associated with the integrated circuit configured to be installed in the commodity mobile phone, the software, when installed in the commodity mobile phone, configured to operate in conjunction with the integrated circuit to, when the commodity mobile phone receives a call from a calling phone:
    send a signal to the calling phone indicating that the commodity mobile phone is capable of cooperating to provide an encrypted connection;
    authenticate itself to the calling phone; and
    establish an encrypted connection with the calling phone, whereby voice communications between the commodity mobile phone and the calling phone are encrypted end to end.

18. The system of claim 17 wherein the integrated circuit comprises a microSD card.

19. The system of claim 17 wherein the software, when installed and executing in the commodity mobile phone, is further configured to, upon sending the signal to the calling phone and being disconnected from the calling phone, operate to automatically establish a second connection with the calling phone, wherein the second connection is determined in part by information contained in the signal and wherein the encrypted connection comprises the second connection.

20. The system of claim 17 wherein the software is supplied to the commodity mobile phone via over the air downloading.

21. The system of claim 17 wherein the software is stored on the integrated circuit prior to installation in the commodity mobile phone.

22. The system of claim 17 wherein the signal comprises DTMF tones.

23. The system of claim 17 wherein programming the programmable processor requires a cryptographic key.

24. The system of claim 17 wherein at least one of the integrated circuit and the software, when executed in the commodity mobile phone, is further configured to retrieve, from the commodity mobile phone, an identification of the commodity mobile phone upon being first coupled to the commodity mobile phone and to store the identification in the nonvolatile memory, the at least one of the software and the integrated circuit being configured to reduce available operations if coupled to an electronic device associated with an identification that is not stored in the nonvolatile memory.

25. The system of claim 17 wherein the calling phone and the commodity mobile phone are manufactured by different entities.

26. The system of claim 17 wherein the software, when installed and executing in the commodity mobile phone, is configured to operate in conjunction with the integrated circuit to establish a secure context for the commodity mobile phone and the calling phone as part of authenticating the commodity mobile phone to the calling phone.

27. The system of claim 17 wherein the commodity mobile phone provides an indication to a user that an encrypted connection is available.

28. The system of claim 17 wherein the calling phone is not a mobile phone.

29. A method of establishing an encrypted end to end phone call from a commodity mobile phone provisioned with software and a detachable tamper resistant and tamper evident integrated circuit, the integrated circuit comprising a cryptographic engine, a programmable processor, a first cryptographic key and a nonvolatile memory protected by the first cryptographic key, the method comprising:
  receiving, in response to a connection placed from the commodity mobile phone to a destination phone, a signal from the destination phone, the signal indicating that the destination phone is capable of cooperating to provide an encrypted connection;

authenticating, using the software and the integrated circuit, the destination phone; and establishing an encrypted connection with the destination phone, whereby voice communications between the commodity mobile phone and the destination phone are encrypted end to end.

30. The method of claim 29 wherein the integrated circuit comprises a microSD card.

31. The method of claim 29 further comprising disconnecting from the destination phone and establishing a second connection with the destination phone, wherein the second connection is determined in part by information contained in the signal and wherein the encrypted connection comprises the second connection.

32. The method of claim 29 wherein the connection comprises manually dialing a number of the destination phone.

33. The method of claim 29 wherein the connection comprises using an automatic dialer.

34. The method of claim 29 wherein the software is supplied to the commodity mobile phone via over the air downloading.

35. The method of claim 29 wherein the software is stored on the integrated circuit prior to installation in the commodity mobile phone.

36. The method of claim 29 wherein the signal comprises DTMF tones.

37. The method of claim 29 further comprising recording that the destination phone was capable of cooperating to provide an encrypted connection.

38. The method of claim 37 further comprising, when the commodity mobile phone subsequently connects to the destination phone, establishing an encrypted connection with the destination phone without first receiving a signal indicating that an encrypted connection is available.

39. The method of claim 29 wherein programming the programmable processor requires a cryptographic key.

40. The method of claim 29 further comprising:
retrieving from the commodity mobile phone, upon the integrated circuit being coupled to the commodity mobile phone, an identification of the commodity mobile phone and storing the identification in the nonvolatile memory; and reducing available operations of one or more of the integrated circuit and the software if the integrated circuit is coupled to an electronic device associated with an identification that is not stored in the nonvolatile memory.

41. The method of claim 29 wherein the destination phone and the commodity mobile phone are manufactured by different entities.

42. The method of claim 29 wherein the authenticating comprises establishing a secure context for the commodity mobile phone and the destination phone.

43. The method of claim 29 further comprising providing an indication to a user that an encrypted connection is available.

44. The method of claim 29 wherein the destination phone is not a mobile phone.

45. A method of establishing an encrypted end to end phone call placed from a calling phone to a commodity mobile phone provisioned with software and a detachable tamper resistant and tamper evident integrated circuit, the integrated circuit comprising a cryptographic engine, a programmable processor, a first cryptographic key and a nonvolatile memory protected by the first cryptographic key, the method comprising:

sending, by the commodity mobile phone and in response to a connection placed to the commodity mobile phone from the calling phone, a signal indicating that the commodity mobile phone is capable of cooperating to provide an encrypted connection;

authenticating, using the software and the integrated circuit, the commodity mobile phone to the calling phone; and establishing an encrypted connection with the commodity mobile phone, whereby voice communications between the commodity mobile phone and the calling phone are encrypted end to end.

46. The method of claim 45 wherein the integrated circuit comprises a microSD card.

47. The method of claim 45 further comprising automatically establishing a second connection with the calling phone upon sending the signal to the calling phone and being disconnected from the calling phone, wherein the second connection is determined in part by information contained in the signal and wherein the encrypted connection comprises the second connection.

48. The method of claim 45 further comprising supplying the software to the commodity mobile phone via over the air downloading.

49. The method of claim 45 further comprising storing the software on the integrated circuit prior to installation in the commodity mobile phone.

50. The method of claim 45 wherein the signal comprises DTMF tones.

51. The method of claim 45 wherein programming the programmable processor requires a cryptographic key.

52. The method of claim 45 further comprising:
retrieving from the commodity mobile phone, upon the integrated circuit being coupled to the commodity mobile phone, an identification of the commodity mobile phone and storing the identification in the nonvolatile memory; and reducing available operations of one or more of the integrated circuit and the software if the integrated circuit is coupled to an electronic device associated with an identification that is not stored in the nonvolatile memory.

53. The method of claim 45 wherein the calling phone and the commodity mobile phone are manufactured by different entities.

54. The method of claim 45 further comprising establishing a secure context for the commodity mobile phone and the calling phone as part of authenticating the commodity mobile phone to the calling phone.

55. The method of claim 45 further comprising providing, by the commodity mobile phone, an indication to a user that an encrypted connection is available.

56. The method of claim 45 wherein the calling phone is not a mobile phone.

57. A system for end to end encrypted mobile telephony, the system comprising:
a tamper resistant and tamper evident integrated circuit adapted to be coupled to a commodity mobile phone, the integrated circuit comprising a cryptographic engine, a programmable processor, a first cryptographic key and a nonvolatile memory, at least a portion of which is at least partially protected by the first cryptographic key; and software associated with the integrated circuit configured to be installed in the commodity mobile phone, the software, when installed in the commodity mobile phone, configured to operate in conjunction with the integrated circuit to, when a user of the commodity mobile phone initiates a connection to a destination phone using a connection technique of the commodity mobile phone:
  retrieve a record associated with the destination phone, the record reflecting that an encrypted connection may be established, the record being previously stored as a result of a prior connection between the commodity mobile phone and the destination phone;
  establish a connection to the destination phone;
  authenticate the destination phone; and
  provide end to end encrypted voice communications between the commodity mobile phone and the destination phone.

58. The system of claim 57 wherein the integrated circuit comprises a microSD card.

59. The system of claim 57 wherein the connection technique comprises manually dialing a number of the destination phone.

60. The system of claim 57 wherein the connection technique comprises using an automatic dialer.

61. The system of claim 57 wherein the software is supplied to the commodity mobile phone via over the air downloading.

62. The system of claim 57 wherein the software is stored on the integrated circuit prior to installation in the commodity mobile phone.

63. The system of claim 57 wherein at least one of the integrated circuit and the software, when executed in the commodity mobile phone, is further configured to retrieve, from the commodity mobile phone, an identification of the commodity mobile phone upon being first coupled to the commodity mobile phone and to store the identification in the nonvolatile memory, the at least one of the software and the integrated circuit being configured to reduce available operations if coupled to an electronic device associated with an identification that is not stored in the nonvolatile memory.

64. The system of claim 57 wherein the destination phone and the commodity mobile phone are manufactured by different entities.

65. The system of claim 57 wherein the software, when installed and executing in the commodity mobile phone, is configured to operate in conjunction with the integrated circuit to establish a secure context for the commodity mobile phone and the destination phone as part of authenticating the destination phone.

66. The system of claim 57 wherein the commodity mobile phone provides an indication to a user that an encrypted connection is available.

67. The system of claim 57 wherein the destination phone is not a mobile phone.

68. A method of establishing an encrypted end to end phone call from a commodity mobile phone provisioned with software and a detachable tamper resistant and tamper evident integrated circuit, the integrated circuit comprising a cryptographic engine, a programmable processor, a first cryptographic key and a nonvolatile memory protected by the first cryptographic key, the method comprising:
  retrieving, in response to a user of the commodity mobile phone initiating a connection to a destination phone using a connection technique of the commodity mobile phone, a record associated with the destination phone, the record reflecting that an encrypted connection may be established, the record being previously stored as a result of a prior connection between the commodity mobile phone and the destination phone;
  establishing a connection to the destination phone;
  authenticating the destination phone; and
  providing end to end encrypted voice communications between the commodity mobile phone and the destination phone.

69. The method of claim 68 wherein the integrated circuit comprises a microSD card.

70. The method of claim 68 wherein the initiating comprises manually dialing a number of the destination phone.

71. The method of claim 68 wherein the initiating comprises using an automatic dialer.

72. The method of claim 68 wherein the software is supplied to the commodity mobile phone via over the air downloading.

73. The method of claim 68 wherein the software is stored on the integrated circuit prior to installation in the commodity mobile phone.

74. The method of claim 68 wherein programming the programmable processor requires a cryptographic key.

75. The method of claim 68 further comprising:
  retrieving from the commodity mobile phone, upon the integrated circuit being coupled to the commodity mobile phone, an identification of the commodity mobile phone and storing the identification in the nonvolatile memory; and
  reducing available operations of one or more of the integrated circuit and the software if the integrated circuit is coupled to an electronic device associated with an identification that is not stored in the nonvolatile memory.

76. The method of claim 68 wherein the destination phone and the commodity mobile phone are manufactured by different entities.

77. The method of claim 68 wherein the authenticating comprises establishing a secure context for the commodity mobile phone and the destination phone.

78. The method of claim 68 further comprising providing an indication to a user that an encrypted connection is available.

79. The method of claim 68 wherein the destination phone is not a mobile phone.

80. A non-transitory computer readable medium containing instructions adapted to be installed in a commodity mobile phone provisioned with a detachable tamper resistant and tamper evident integrated circuit, wherein the integrated circuit comprises a cryptographic engine, a programmable processor, a first cryptographic key and a nonvolatile memory protected by the first cryptographic key, the instructions adapted to cause the commodity mobile phone to:
  retrieve, in response to a user of the commodity mobile phone initiating a connection to a destination phone using a connection technique of the commodity mobile phone, a record associated with the destination phone, the record reflecting that an encrypted connection may be established, the record being previously stored as a result of a prior connection between the commodity mobile phone and the destination phone;
  establish a connection to the destination phone;
  authenticate the destination phone; and
  provide end to end encrypted voice communications between the commodity mobile phone and the destination phone.

81. The computer readable medium of claim 80 wherein the integrated circuit comprises computer readable medium.

82. The computer readable medium of claim 80 wherein the integrated circuit comprises a microSD card.

83. The computer readable medium of claim 80 wherein the initiating comprises manually dialing a number of the destination phone.

84. The computer readable medium of claim 80 wherein the initiating comprises using an automatic dialer.

85. The computer readable medium of claim 80 wherein programming the programmable processor requires a cryptographic key.

86. The computer readable medium of claim 80 wherein the instructions are further adapted to:
- retrieve from the commodity mobile phone, upon the integrated circuit being coupled to the commodity mobile phone, an identification of the commodity mobile phone and store the identification in the nonvolatile memory; and
- reduce available operations of one or more of the integrated circuit and the software if the integrated circuit is coupled to an electronic device associated with an identification that is not stored in the nonvolatile memory.

87. The computer readable medium of claim 80 wherein the destination phone and the commodity mobile phone are manufactured by different entities.

88. The computer readable medium of claim 80 wherein the authenticating comprises establishing a secure context for the commodity mobile phone and the destination phone.

89. The computer readable medium of claim 80 wherein the instructions are further adapted to provide an indication to a user that an encrypted connection is available.

90. The computer readable medium of claim 80 wherein the destination phone is not a mobile phone.

\* \* \* \* \*